United States Patent
Tanaka et al.

(10) Patent No.: US 6,169,714 B1
(45) Date of Patent: Jan. 2, 2001

(54) APPARATUS AND METHOD FOR RECORDING/REPRODUCING MAGNETO-OPTICAL INFORMATION

(75) Inventors: Yasuhito Tanaka, Tokyo; Masaaki Kurebayashi, Ebina; Takeshi Maeda, Kokubunji; Hitoshi Watanabe, Ibaraki-ken; Tetsu Watanabe, Tokyo; Shigemi Maeda, Yamatokooriyama; Satoshi Sumi, Gifu; Nobuhide Matsubayashi, Hachioji; Michio Matsuura, Akashi, all of (JP)

(73) Assignees: Hitachi, Ltd.; Sony Corp., both of Tokyo; Sharp Kabushiki Kaisha, Osaka; Olympus Optical Co., Ltd., Tokyo; Sanyo Electric Co., Ltd., Moriguchi; Fujitsu Ltd., Kanagawa; Hitachi Maxell, Ltd., Osaka, all of (JP)

( * ) Notice: Under 35 U.S.C. 154(b), the term of this patent shall be extended for 0 days.

(21) Appl. No.: 09/173,069

(22) Filed: Oct. 16, 1998

(30) Foreign Application Priority Data

Oct. 17, 1997 (JP) .................................................. 9-285662

(51) Int. Cl.[7] ...................................................... G11B 7/09
(52) U.S. Cl. .................................... 369/44.28; 369/44.29; 369/44.35
(58) Field of Search ............................... 369/44.27, 44.28, 369/44.29, 44.31, 44.32, 44.34, 44.35, 44.41, 47, 58, 54, 13, 32

(56) References Cited

U.S. PATENT DOCUMENTS

| | | | |
|---|---|---|---|
| 5,768,227 | * 6/1998 | Baba ................................ | 369/44.28 |
| 5,889,752 | * 3/1999 | Maeda et al. ..................... | 369/54 X |
| 5,894,462 | * 4/1999 | Hwangbo ......................... | 369/44.29 |
| 5,896,354 | * 4/1999 | Yamashita et al. ............... | 369/44.34 |

FOREIGN PATENT DOCUMENTS

| | | |
|---|---|---|
| 5-12731 | 1/1993 | (JP) . |
| 8-36773 | 2/1996 | (JP) . |
| 8-221760 | 8/1996 | (JP) . |

* cited by examiner

Primary Examiner—Muhammad Edun
(74) Attorney, Agent, or Firm—Antonelli, Terry, Stout & Kraus, LLP

(57) ABSTRACT

A magneto-optical information recording/reproducing apparatus in which a magneto-optical information recording medium at least including a first magnetic film having perpendicular magnetic anisotropy, and a second magnetic film to which information recorded on the first magnetic film is transferred by irradiation of a laser beam, is used so that a readout laser beam is irradiated onto the second magnetic film to thereby readout the information transferred to the second magnetic film. The apparatus includes a 2-split detection circuit for receiving the readout laser beam reflected from the second magnetic film of the recording medium, and a subtraction circuit in which output signals of the two detection elements of the 2-split detection circuit are subtracted from each other to generate a differential signal. The apparatus further comprises a circuit for making a spot of the laser beam jump one track before readout of the information from the magneto-optical information recording medium, a positive/negative balance correction circuit for detecting an amplitude ratio between positive and negative side amplitudes in a track jump signal generated in the differential signal from the subtraction circuit in response to the track jump to thereby output a correction signal in accordance with the amplitude ratio, and an addition circuit for adding the correction signal to the differential signal to thereby generate a tracking error signal for tracking control used in readout of the magneto-optical information from the magneto-optical information recording medium.

12 Claims, 12 Drawing Sheets

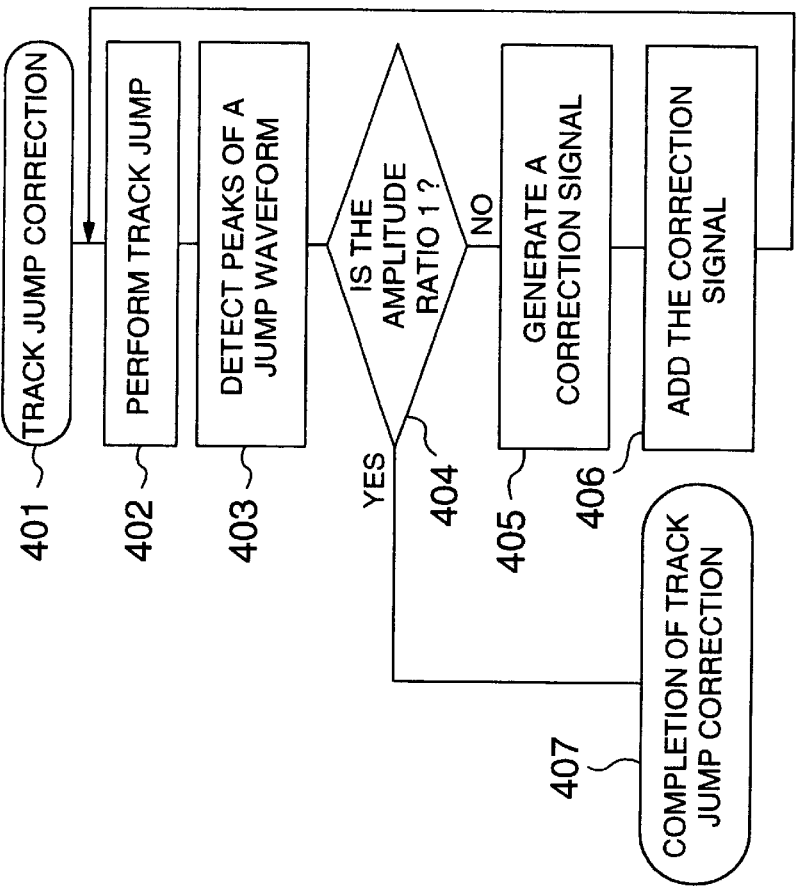
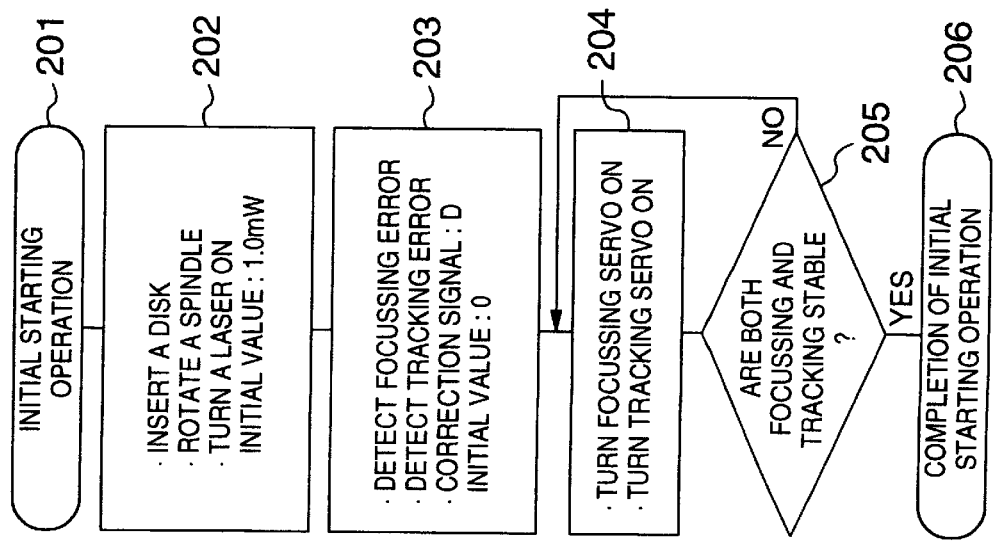

Eoff

TRACKING
CONTROL
OFFSET
LEVEL

APPARATUS AND METHOD FOR RECORDING/REPRODUCING MAGNETO-OPTICAL INFORMATION

BACKGROUND OF THE INVENTION

The present invention relates to a magneto-optical information recording/reproducing apparatus, and particularly to a magneto-optical information recording/reproducing apparatus in which the recording/reproducing characteristic can be effectively prevented from being lowered by relative tilt between a magneto-optical information recording medium and a pickup, or the like.

Recently, the magneto-optical information recording/reproducing apparatus has been put into practical use as a large-capacity data file, and the magneto-optical information recording/reproducing apparatus is expected that its capacity is more increased.

A magneto-optical disk as a representative magneto-optical information recording medium has a magnetic film having perpendicular magnetic anisotropy. Information recording on the magneto-optical disk is performed by a process in which a laser beam is focussed onto the magneto-optical disk to locally heat the magnetic film, and, at the same time, a magnetic field is given thereto from the outside to thereby form a magnetic domain having a magnetizing direction modulated in accordance with information.

On the other hand, the readout of the recorded information from such a magneto-optical disk is performed by irradiation of a linear-polarization laser beam having power smaller than that at the recording time onto the magneto-optical disk. Because magnetization having a direction in accordance with information remains in the magnetic film of the magneto-optical disk, a plane of polarization of the laser beam reflected from the magneto-optical disk rotates. This phenomenon is called Kerr effect. The rotation angle of the plane of polarization is called Kerr rotation angle. Because the Kerr rotation angle changes in dependence on the direction and magnitude of magnetization, the recorded information can be readout by detection of the Kerr rotation angle.

To increase recording density in the afore-mentioned recording/reproducing system, it is necessary to reduce a recording mark to thereby narrow a track pitch. Generally, in an optical disk including a magneto-optical disk in which a recording signal is readout by a laser beam, the spot size of the laser beam to be focussed onto the optical disk, that is, the resolution at the time of the readout is determined on the basis of both the wavelength of a readout laser beam and the numerical aperture of an objective lens. This is a limitation to increase recording density.

A large number of techniques called magnetically induced super resolution for readout a smaller recording mark than the spot size of the readout laser beam have been proposed to solve the above problem in the magneto-optical information recording/reproducing apparatus. In these techniques, at least a recording magnetic film and a readout magnetic film are provided in the magneto-optical disk and the phenomenon that the temperature on the magneto-optical disk on the basis of the laser beam varies according to the light spot is utilized. That is, the resolution is increased such that only in a limited temperature range, the magnetization of the recording magnetic film is transferred to the readout magnetic film, while in temperature ranges other than the limited temperature range, a magnetic mask is formed so that the magnetization of the readout magnetic film is unidirectionally oriented independently of the direction and magnitude of magnetization of the recording magnetic film.

A conventional example using one of the magnetically induced super resolution techniques is described in JP-A-5-012731. A magneto-optical recording medium used in the conventional example and the principle of information readout will be described below with reference to FIG. 14. In FIG. 14, the reference numeral 100 designates a readout laser beam; 200, a magneto-optical information recording medium; 201, a recording magnetic layer; and 202, a readout magnetic layer.

The magneto-optical information recording medium 200 is constituted by a laminate of the recording magnetic layer 201 and the readout magnetic layer 202. In the recording magnetic layer 201, recorded magnetic domains based on recorded information are formed so that the size of each recorded magnetic domain is smaller than the beam spot size of the readout laser beam 100. The readout magnetic layer 202 has such a characteristic that the layer 202 serves as an in-plane magnetization film at room temperature and as a perpendicular magnetization film at a temperature not lower than a predetermined value, for example, 80° C.

To readout recorded information from the magneto-optical information recording medium 200, beam-like readout laser light 100 is irradiated from the readout magnetic layer 202 side. When information is readout at a relatively low readout velocity, the temperature on the magneto-optical information recording medium 200 becomes maximum in the vicinity (hereinafter referred to as "the highest temperature point") of the center of the beam spot of the readout laser beam 100 so that the temperature decreases as the position approaches a fringe of the beam spot. Accordingly, the readout magnetic layer 202 exhibits a perpendicular magnetic characteristic only in a region at the center portion of the beam spot where the temperature is not lower than a predetermined value, for example, 80° C. In this region, a recorded magnetic domain formed in the recording magnetic layer 201 is transferred to the readout magnetic layer 202 by exchange coupling force, so that a Kerr effect occurs in the reflected readout laser beam 100. The region in which a recorded magnetic domain is transferred (hereinafter referred to as transfer temperature region) is smaller than the size of the beam spot of the readout laser beam 100, so that a high-density recorded information signal can be readout.

As described above, the magnetically induced super resolution techniques are very effective and excellent means for enhancing resolution and reducing crosstalk. The following problems, however, arise when the magneto-optical information recording medium has a tilt with respect to the optical axis of a bundle of readout laser light (readout laser beam), that is, when a surface of the magneto-optical information recording medium is not perpendicular to the optical axis of the readout laser beam.

When recorded information is to be readout from the magneto-optical disk as a magneto-optical information recording medium, tracking control is performed so that the spot of the readout laser beam accurately tracks a recorded information track formed in the magneto-optical disk. As a method for performing such tracking control, a method called push-pull method is generally applied. This method utilizes a magneto-optical disk having a configuration in which magnetic layers are laminated on a transparent substrate having a guide groove formed therein (in the case of a magneto-optical disk 200 configured as shown in FIG. 14, a readout magnetic layer 202 is laminated on a transparent substrate and a recording magnetic layer 201 is laminated on the readout magnetic layer 202). That is, the tracking displacement is detected by use of a diffraction beam which is generated by the guide groove when a readout laser beam is irradiated onto the magneto-optical disk 200.

This method will be described below with reference to FIG. 15 which shows a radial section of the magneto-optical disk 200. When a readout laser beam is irradiated onto the magneto-optical disk 200 by means not shown, a reflected laser beam 300 including a diffraction beam generated by the guide groove on the magneto-optical disk 200 is generated. The reflected laser beam 300 enters into a 2-split detector 402 constituted by two light-receiving elements 402a and 402b disposed symmetrically with respect to the center line of the track, through optical means such as an objective lens 401, etc. Output signals of levels corresponding to the quantities of beams received in the light-receiving elements 402a and 402b are subtracted from each other by a subtractor 403, so that a tracking error signal in accordance with the difference between the levels of the output signals is obtained. Tracking control is performed on the basis of the tracking error signal. However, when the center of the spot of the readout laser beam irradiated onto the magneto-optical disk 200 gets out of the center line of the track to produce tracking displacement, a difference is generated between the quantities of diffraction beams received in the light-receiving elements 402a and 402b so that a tracking error signal in accordance with the difference is obtained.

Accordingly, a first problem produced by tilt of the magneto-optical disk relative to the optical axis of the readout laser beam is that accurate tracking control cannot be performed.

Assume now that the center of the spot of the readout laser beam coincides with the center position of the track in the condition that the magneto-optical disk 200 is not tilted with respect to the optical axis of the readout laser beam in FIG. 15. Then, the quantities of diffraction beams received in the light-receiving elements 402a and 402b are equalized to each other, so that the level of the tracking error signal obtained from the subtractor 403 becomes zero to exhibit a tracking state.

On the contrary, when the center of the spot of the readout laser beam coincides with the center line of the track in the condition that the magneto-optical disk 200 is inclined with respect to the optical axis of the readout laser beam, the generated diffraction beam distribution with respect to the optical axis becomes asymmetric, so that the quantities of diffraction beams received in the light-receiving elements 402a and 402b are different from each other. Accordingly, the level of the tracking error signal obtained from the subtractor 403 does not become zero. As a result, tracking control is performed so that the center of the spot of the readout laser beam gets out of the center line of the track. FIG. 15 shows this state. For example, in the state shown in FIG. 15, the level of the tracking error signal becomes zero, so that tracking control is stabilized.

On the other hand, when the magneto-optical disk 200 is tilted with respect to the optical axis of the readout laser beam as described above, the highest temperature point in the transfer temperature region of the magneto-optical disk 200 on the basis of the readout laser beam gets out of the highest light intensity point which is the center of the spot of the readout laser beam, as shown in FIG. 16, because the readout laser beam is radiated obliquely onto the surface of the magneto-optical disk 200. Furthermore, the direction of displacement of the highest temperature point from the highest light intensity point is the same as the direction of displacement of the center of the spot from the center line of the track. That is, the highest temperature point gets out of the center line of the track more remarkably than the center of the spot. This shows that the transfer temperature region in which a recorded magnetic domain is transferred from the recording magnetic layer 201 to the readout magnetic layer 202 as explained in FIG. 14 shifts in the direction of the width of the track remarkably from the center of the spot.

When tracking control is stable in the aforementioned tracking error state, the readout laser beam scans the magneto-optical disk 200 in a state in which the center of the spot is out of the center line of the track, so that the transfer temperature region moves so as to be displaced more largely from the center line of the track. As a result, the transfer temperature region is apt to be laid over another adjacent track, so that crosstalk from the adjacent track occurs easily. Particularly in the case where high recording density is intended, the track pitch becomes very narrow. Accordingly, such crosstalk occurs more easily, so that the quality of the readout information signal is deteriorated.

A second problem is that if the magneto-optical information recording medium is inclined with respect to the optical axis of the readout laser beam, desired resolution or signal-to-noise ratio cannot be obtained because effective power of the readout laser beam on the magneto-optical information recording medium is lowered.

FIG. 17 shows measured results of the relation between tilt of the magneto-optical disk with respect to the optical axis of the readout laser beam and the bit error rate.

It is apparent from FIG. 17 that the bit error rate deteriorates as the tilt of the magneto-optical disk increases and that when, for example, the bit error rate is to be suppressed to a value not larger than $10^{-4}$, the bit error rate exceeds the value though the magneto-optical disk is slightly tilted. This is because the signal-to-noise ratio decreases and optimum resolution for minimizing the bit error rate cannot be obtained as the tilt of the magneto-optical disk increases.

SUMMARY OF THE INVENTION

An object of the present invention is to provide a magneto-optical information recording/reproducing apparatus which uses a magnetically induced super resolution technique to solve the aforementioned problems so that both occurrence of the tracking error caused by tilt of a magneto-optical information recording medium and reduction of effective power of a readout laser beam on the magneto-optical information recording medium can be prevented.

In order to achieve the foregoing object, the present invention employs a tracking control method called push-pull method in which a readout laser beam reflected from a magneto-optical information recording medium is received by a 2-split detection means so that a differential signal obtained from two output signals of the 2-split detection means is used for tracking control. Before readout, the readout laser beam is subjected to track jump on the magneto-optical information recording medium so that the differential signal obtained on the basis of the track jump is used as a track jump signal for detecting tracking displacement in the state where the magneto-optical information recording medium is tilted with respect to the optical axis of the readout laser beam.

In the tracking jump signal, a first peak is generated when the spot of the readout laser beam radially crosses one track and a second peak having polarity different from that of the first peak is generated when the spot of the readout laser beam shifts to an adjacent track. When such track jump is caused in the state where tracking displacement occurs in the readout laser beam, the amplitude ratio between the first and second peaks varies in accordance with the quantity of tracking displacement. Accordingly, the quantity of tracking displacement can be detected on the basis of the amplitude ratio between these peaks.

In this manner, a correction signal in accordance with the quantity of tracking displacement can be generated on the basis of the track jump signal. When the correction signal is added to the differential signal at the time of readout to perform tracking control, the center of the spot of the readout laser beam can be made coincident with the center position of the track on the magneto-optical information recording medium even in the case where the magneto-optical information recording medium is tilted with respect to the optical axis of the readout laser beam.

Further, in the present invention, at least two kinds of defined patterns are recorded in a predetermined region of the magneto-optical information recording medium. These defined patterns are readout to detect the amplitude ratio therebetween, so that the intensity of the readout laser beam is controlled to equalize the amplitude ratio to a predetermined value.

When the magneto-optical information recording medium is tilted with the optical axis of the readout laser beam, the effective power of the readout laser beam on the magneto-optical information recording medium is lowered in accordance with the magnitude of the tilt. Although the amplitude of the readout signal changes when the effective power changes, the percentage of the amplitude change varies in accordance with the defined patterns recorded on the magneto-optical information recording medium. Accordingly, because the readout amplitude ratio between the defined patterns changes when the effective power changes, the change of the effective power can be detected on the basis of the change of the amplitude ratio.

Because the present invention is configured such that the intensity of the readout laser beam is controlled to equalize the readout amplitude values of the defined patterns to predetermined values, the effective power of the readout laser beam on the magneto-optical information recording medium is kept constant even in the case where the magneto-optical information recording medium is tilted with respect to the optical axis of the readout laser beam. Accordingly, the increase of the bit error rate in the readout information signal can be suppressed.

Further, in order to achieve the foregoing object, the present invention is configured such that the correction signal obtained on the basis of the amplitude ratio between positive and negative peaks of the track jump signal is amplified with a predetermined amplification factor.

When tracking control is performed so that the center of the spot of the readout laser beam coincides with the center line of the track in the state in which the magneto-optical information recording medium is tilted with respect to the optical axis of the readout laser beam, the highest temperature point obtained in the transfer temperature region by the readout laser beam gets out of the center line of the track. Therefore, the correction signal is amplified by an amplifier having a predetermined amplification factor as described above to thereby perform tracking control to make the highest temperature point coincide with the center line of the track. As a result, the transfer temperature region is brought near to the center line of the track so that crosstalk is prevented from occurring more securely.

BRIEF DESCRIPTION OF THE DRAWINGS

FIG. 2 is a flow chart of an initial starting operation in the configuration depicted in FIG. 1;

FIG. 4 is a flow chart showing the operation of track jump correction;

DESCRIPTION OF THE PREFERRED EMBODIMENTS

Embodiments of the preset invention will be described below with reference to the drawings.

Figure 1:
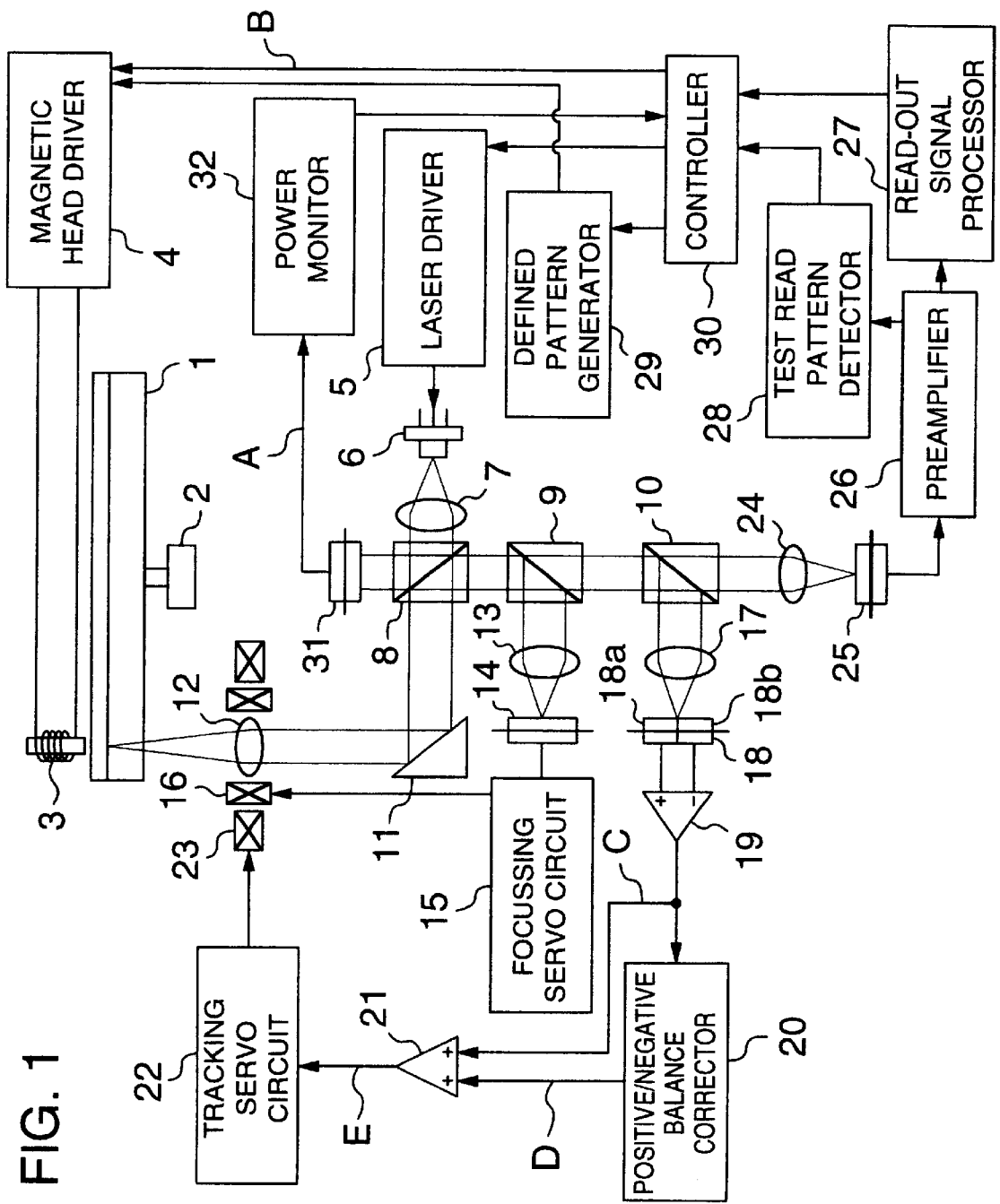
FIG. 1 is a block diagram showing a magneto-optical information recording/reproducing apparatus according to an embodiment of the present invention.

FIG. 1 is a block diagram showing a magneto-optical information recording/reproducing apparatus according to a first embodiment of the present invention. In FIG. 1, the reference numeral 1 designates a magneto-optical disk as a magneto-optical information recording medium; 2, a spindle motor; 3, a magnetic head; 4, a magnetic head driver; 5, a laser driver; 6, a laser diode; 7, a collimator lens; 8 to 10, beam splitters; 11, a reflection mirror; 12, an objective lens; 13, a focus lens; 14, a detector; 15, a focussing servo circuit; 16, a focussing actuator; 17, a focus lens; 18, a 2-split detector; 18a and 18b, light-receiving elements; 19, a subtractor; 20, a positive/negative balance corrector; 21, an adder; 22, a tracking servo circuit; 23, a tracking actuator; 24, a focus lens; 25, a detector; 26, a preamplifier; 27, a readout signal processor; 28, a test read pattern detector; 29, a defined pattern generator; 30, a controller; 31, a detector; and 32, a power monitor.

The operation of the apparatus according to this embodiment will be described below in connection with FIG. 2 which is a flow chart showing an initial starting operation. In the following description, it is assumed that the information recording is carried out by a magnetic field modulation recording method.

In FIG. 1, when the initial starting operation is started (step 201) so that the magneto-optical disk 1 is mounted, the controller 30 detects the mounting of the magneto-optical disk 1 to rotate the spindle motor 2 at a predetermined speed to thereby rotate the magneto-optical disk 1. At the same time, the controller 30 gives the laser driver 5 an instruction to make the laser diode 6 generate laser light, for example, with an initial value of 1.0 mW (step 202).

Figure 14:
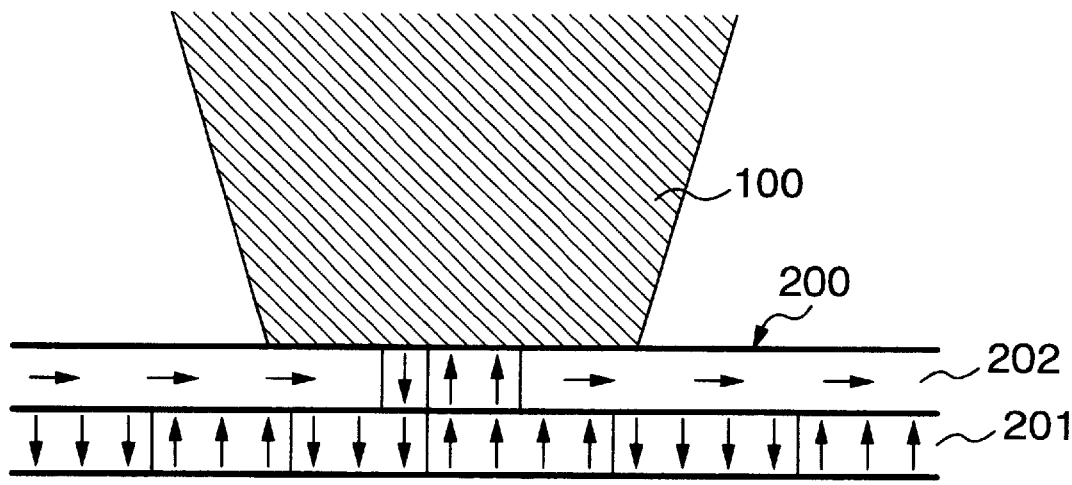
FIG. 14 is a prior art explanatory view showing the principle of a magnetically induced super resolution technique used for readout information from a magneto-optical information recording medium.
Figure 15:
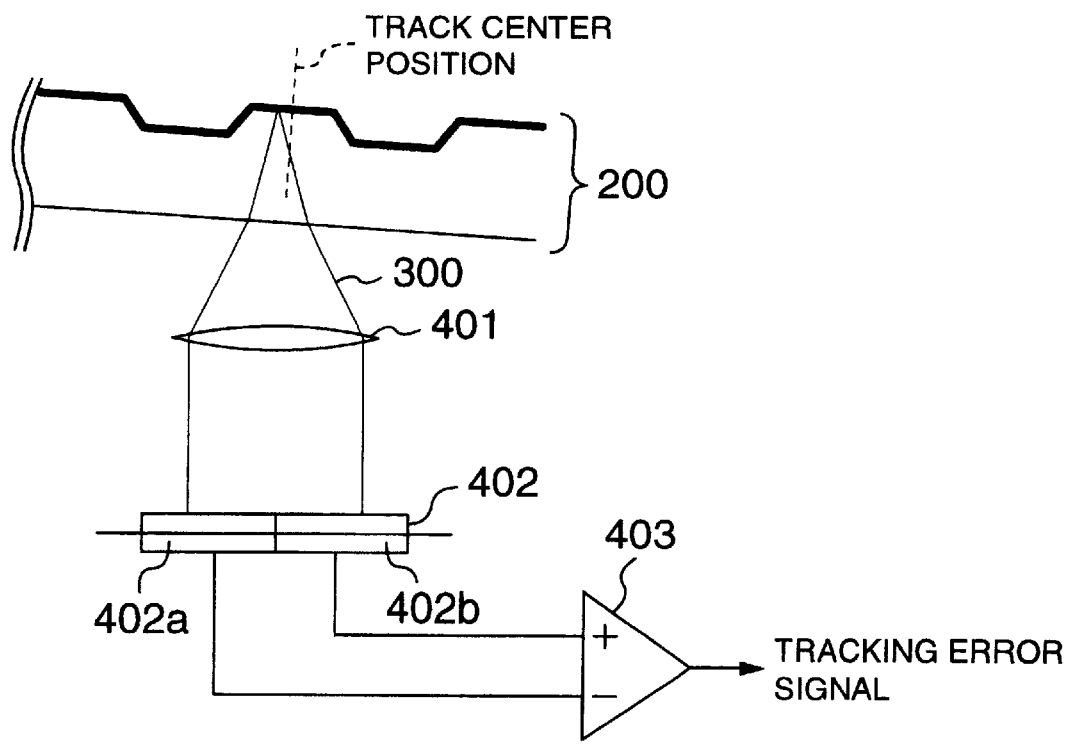
FIG. 15 is a view showing a tracking state in the case where a magneto-optical disk is inclined with respect to the optical axis of a readout laser beam.

Like the magneto-optical information recording medium shown in FIG. 14, the magneto-optical disk 1 has a recording magnetic layer and a readout magnetic layer.

The laser light generated by the laser diode 6 is collimated to form a parallel pencil of rays (that is, a laser beam) by the collimator lens 7 and then enters into the beam splitter 8 which splits the laser beam into a reflection beam led to the detector 31 for the power monitor and a transmission beam led to the reflection mirror 11. The detector 31 receives the reflection beam from the beam splitter 8 and generates a laser light intensity signal A having a level corresponding to the quantity of received light. The laser light intensity signal A is supplied to the power monitor 32, so that the controller 30 controls the laser driver 5 to make the laser diode 6 generate laser light with optimum intensity in accordance with the output of the power monitor 32. On the other hand, the transmission beam of the beam splitter 8 is turned by the reflection mirror 11 and then focussed on the readout magnetic layer side of the magneto-optical disk 1 by the objective lens 12.

For recording information data, or the like, the power of the laser light is set so that the recording magnetic layer of the magneto-optical disk 1 is heated to a temperature to reduce the magnetic coercive force thereof sufficiently. At the same time, information data B to be recorded is supplied from the controller 30 to the magnetic head driver 4, so that a drive signal corresponding to the information data B is supplied from the magnetic head driver 4 to the magnetic head 3. The magnetic head 3 is provided in the recording magnetic layer side of the magneto-optical disk 1 so that the information data B is recorded on the recording magnetic layer through a magnetic field given from the magnetic head 3 to the recording magnetic layer in accordance with the information data B.

Incidentally, for recording information data or formatting, the defined pattern generator 29 is controlled by the controller 30 so that at least two kinds of defined test read patterns (hereinafter referred to as defined patterns) are generated and supplied to the magnetic head driver 4. The magnetic head driver 4 drives the magnetic head 3 on the basis of the defined patterns to modulate the magnetic field to thereby record information on a predetermined region of the recording magnetic layer of the magneto-optical disk 1. In the first embodiment, the defined patterns are achieved by an MO signal having two kinds of repetition marks, that is, a 0.5 $\mu$m-length repetition mark and a 2 $\mu$m-length repetition mark. When the defined patterns are recorded, the recording magnetic layer is heated to a temperature by the laser beam so that the magnetic coercive force thereof is reduced sufficiently.

For readout the information data thus recorded on the magneto-optical disk 1, a beam having power which is strong enough to keep the magnetic coercive force of the recording magnetic layer of the magneto-optical disk 1 but weaker than the power at the time of recording is used as the readout laser beam focussed onto the magneto-optical disk 1 by the objective lens 12. When the beam is reflected from the readout magnetic layer of the magneto-optical disk 1, magneto-optical recording in the transfer temperature region in the spot of the beam is transferred from the recording magnetic layer to the readout magnetic layer. Accordingly, there is provided a Kerr effect in which the plane of polarization of the reflection beam rotates in a direction corresponding to the direction of transferred magnetization.

The readout laser beam thus reflected passes through the objective lens 12. Then, the laser beam is turned by the reflection mirror 11 and further turned by the beam splitter 8, so that the beam is separated, by means of the beam splitter 9, into a reflection beam which is led to the focus lens 13 and a transmission beam which is led to the beam splitter 10. The reflection beam is focussed by means of the focus lens 13 into the detector 14 and converted into an electric signal. The electric signal is supplied to the focussing servo circuit 15, so that a focussing error signal is generated. The focussing actuator 16 operates on the basis of the focussing error signal to perform focussing control so that the readout laser beam is focussed into the readout magnetic layer of the magneto-optical disk 1 within a range of focal depth.

On the other hand, the transmission beam of the beam splitter 9 is led to the beam splitter 10, so that the beam is separated into a reflection beam which is led to the focus lens 17 and a transmission beam which is led to the focus lens 24.

The reflection beam of the beam splitter 10 is focussed into the 2-split detector 18 by the focus lens 17. The 2-split detector 18 is constituted by two light-receiving elements 18*a* and 18*b*. The light-receiving elements 18*a* and 18*b* are disposed so as to be symmetrical with each other with respect to the center line of a track on the magneto-optical disk 1 when the received laser beam is observed from the two light-receiving elements 18*a* and 18*b* in the state where the readout laser beam is in a correct tracking state with respect to the magneto-optical disk 1.

The light-receiving elements 18*a* and 18*b* output electric signals having levels corresponding to the quantities of received light respectively. The electric signals are subtracted from each other by the subtractor 19, so that a differential signal C is generated to be supplied both to the positive/negative balance corrector 20 and to the adder 21. In a conventional magneto-optical information recording/reproducing apparatus, the differential signal C is used as a tracking error signal.

In the first embodiment, the positive/negative balance corrector 20 is provided to detect the quantity of tracking displacement caused by the tilt of the magneto-optical disk 1 with respect to the optical axis of the readout laser beam radiated onto the magneto-optical disk 1.

In the first embodiment, therefore, before the recorded information data is readout, the level of a DC correction signal D generated from the positive/negative balance corrector 20 is set to zero (step 203) and the differential signal C obtained from the subtractor 19 is supplied as a tracking error signal to the tracking servo circuit 22 through the adder 21 to drive the tracking actuator 23 to thereby perform tracking control.

At the same time, the focussing servo circuit 15 drives the focussing actuator 16 to perform focussing servo control (step 204).

When a stable tracking state is obtained in the aforementioned manner (steps 205 and 206), track jump is performed by a predetermined means such as the tracking actuator 23, or the like, so that the spot of the readout laser beam on the magneto-optical disk 1 is instantaneously displaced by one track pitch in the direction of the width of the track. The differential signal C obtained from the subtractor 19 in the aforementioned manner has a waveform which varies in accordance with the track jump. This portion of the differential signal C is hereinafter called track jump signal.

When the track jump is performed, tracking displacement occurs because the spot of the readout laser beam on the magneto-optical disk 1 shifts from one track to another adjacent track. In the track jump, first, the amplitude of the track jump signal increases so that a first peak appears because tracking displacement increases in one track. When the beam begins to shift to an adjacent track, the state of large tracking displacement changes to a good tracking state. As a result, a second peak appears in the track jump signal. In this case, the first and second peaks appearing in the track jump signal have polarities reverse to each other because the directions of tracking displacement in the two tracks pertinent to the track jump are reverse to each other.

Figure 3A:
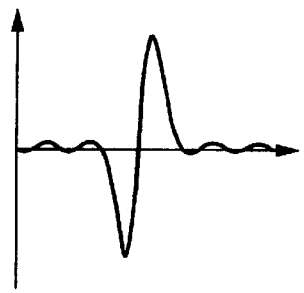
FIGS. 3A, 3B and 3C are characteristic graphs of output waveforms at the time of track jump in the configuration depicted in FIG. 1.
Figure 3B:
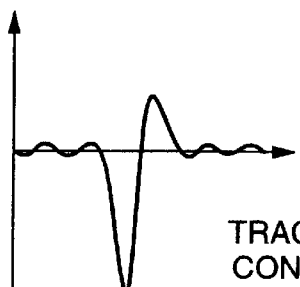

FIG. 3A shows the waveform of a track jump signal in the case where track jump is performed in a good tracking state and in the condition that the magneto-optical disk 1 is not tilted with respect to the optical axis of the readout laser beam. In this case, the sizes (absolute values) of the positive and negative peaks of the track jump signal are equal to each other. On the contrary, in the case where the state of tracking displacement, for example, caused by the tilt of the magneto-optical disk 1 with respect to the optical axis of the readout laser beam is continued stably, the sizes of the positive and negative peaks of the track jump signal are different from each other as shown in FIG. 3B. As a result, the amplitude ratio between these peaks varies in accordance with the quantity of tracking displacement. In other words, the amplitude ratio between these peaks varies in accordance with the quantity of tilt of the magneto-optical disk 1 with respect to the optical axis of the readout laser beam.

Therefore, at the time of track jump, the positive/negative balance corrector 20 takes-in the differential signal C, that is, the track jump signal from the subtractor 19, calculates the amplitude ratio (absolute value) between the positive and negative peaks of the track jump signal and generates a DC correction signal D to set the amplitude ratio to 1.

The correction signal D is added as a tracking offset signal to the differential signal C of the subtractor 19 by the adder 21 to thereby generate a tracking error signal E. The tracking servo circuit 22 drives the tracking actuator 23 on the basis of the tracking error signal E to perform tracking control of the readout laser beam on the magneto-optical disk 1.

That is, as shown in steps 401 to 407 in FIG. 4, track jump correction is started (step 401); track jump is performed (step 402); peaks of the jump waveform are detected (step 403); a judgment is made as to whether the amplitude ratio between peak values is 1 or not (step 404); a correction signal is generated when the amplitude ratio is not 1 (step 405); the correction signal is added (step 406); and track jump is repeated to complete the track jump correction (step 407).

Figure 3C:
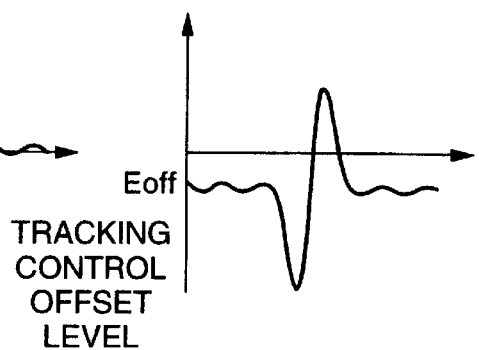

Assume now that track jump is performed in the state in which the magneto-optical disk 1 is inclined with respect to the optical axis of the readout laser beam radiated onto the magneto-optical disk 1 and that the track jump signal thus obtained exhibits the waveform shown in FIG. 3B. Then, a good tracking state (that is, a state in which the center of the spot of the readout laser beam on the magneto-optical disk 1 coincides with the center line of a track) is obtained when a correction signal D is generated on the basis of the track jump signal and added to the differential signal C to perform tracking control. The tracking error signal E obtained in this case exhibits the waveform shown in FIG. 3C. Here, $E_{off}$ is the offset level of the tracking control signal based on the correction signal D. When track jump is performed in this state, positive and negative peaks which are equal in level but reverse in polarity to each other with respect to the level $E_{off}$ of the tracking offset signal are generated in the track jump signal as shown in FIG. 3C.

As described above, in the first embodiment, a good tracking state in which the center of the spot of the readout laser beam on the magneto-optical disk 1 coincides with the center line of a track can be obtained even in the case where the magneto-optical disk 1 is tilted with respect to the optical axis of the readout laser beam radiated onto the magneto-optical disk 1. Accordingly, the quantity of displacement of the transfer temperature region on the magneto-optical disk 1 due to the readout laser beam from the center line of the track can be reduced, so that crosstalk from adjacent tracks can be prevented.

Although track jump may be performed only once to obtain the correction signal D, in order to perform tracking control more accurately, track jump is repeated successively in accordance with the steps 402 to 406 in the flow chart of FIG. 4. That is, the correction signal D is modified successively by the positive/negative balance corrector 20 on the basis of the track jump signal obtained by the repetition of track jump, so that the resulting correction signal D is obtained to thereby set the amplitude ratio between the positive and negative peaks of the track jump signal to 1 accurately.

In this case, the readout laser beam repeats scanning in one portion of the track while track jump is repeated. That is, in this case, the readout laser beam performs scanning for so-called still image readout. Of course, the track is formed helically. The one-round portion of the track to be subjected to the aforementioned repeated readout scanning may be set to a special track portion having a guide groove for tracking and exclusively used for the repeated readout scanning. Alternatively, the repeated readout scanning may be performed in an arbitrary one-round portion of the track as occasion demands.

The transmission beam of the beam splitter 10 is focussed into the detector 25 by the focus lens 24 and converted into an electric signal having a level corresponding to the quantity of light received in the detector 25. The output signal of the detector 25 is amplified by the preamplifier 26 and then supplied both to the test read pattern detector 28 and the readout signal processor 27.

In the first embodiment, the aforementioned defined patterns are readout from the magneto-optical disk 1 for the purpose of readout power correction before information data is readout from the magneto-optical disk 1. As described above, in this occasion, a 0.5 μm-length repetition mark and a 2 μm-length repetition mark are recorded as the defined pattern in the form of an MO signal. First, the repetition marks are readout. Then, the readout amplitude ratio β between the repetition marks is obtained by the test read pattern detector 28. The readout amplitude ratio β is given by the following expression:

$$\beta = A_2/A_1$$

in which $A_1$ is the readout amplitude of the 0.5 μm-length repetition mark, and $A_2$ is the readout amplitude of the 2 μm-length repetition mark.

When the magneto-optical disk 1 is inclined with respect to the optical axis of the readout laser beam, the effective power of the readout laser beam on the magneto-optical disk 1 is lowered, so that the transfer temperature region formed on the magneto-optical disk 1 by the readout laser beam is narrowed. Accordingly, the quantity of magnetization transferred from the recording magnetic layer to the readout magnetic layer on the magneto-optical disk 1 is reduced, so that the readout amplitude values $A_1$ and $A_2$ of the 0.5 μm-length and 2 μm-length repetition marks are reduced.

The length of a short mark such as the 0.5 μm-length repetition mark is, however, approximately equal to the diameter of the transfer temperature region. That is, such a short mark has a length substantially contained in the transfer temperature region. Accordingly, even in the case where the size of the transfer temperature region changes within a range of tilt of the magneto-optical disk 1 with respect to the optical axis of the readout laser beam, the change of the readout amplitude $A_1$ of the 0.5 μm-length repetition mark in accordance with the change of the size of the transfer temperature region is small. On the contrary, the length of a long mark such as the 2 μm-length repetition mark is sufficiently larger than the diameter of the transfer temperature region. Accordingly, as the size of the transfer temperature region changes, the readout amplitude $A_2$ of the 2 μm-length repetition mark changes largely. For this reason, the amplitude ratio β changes in accordance with the change of the size of the transfer temperature region, that is, in accordance with the change of the effective power of the readout laser beam on the magneto-optical disk 1 due to the tilt of the magneto-optical disk 1 with respect to the optical axis of the readout laser beam.

Figure 5:
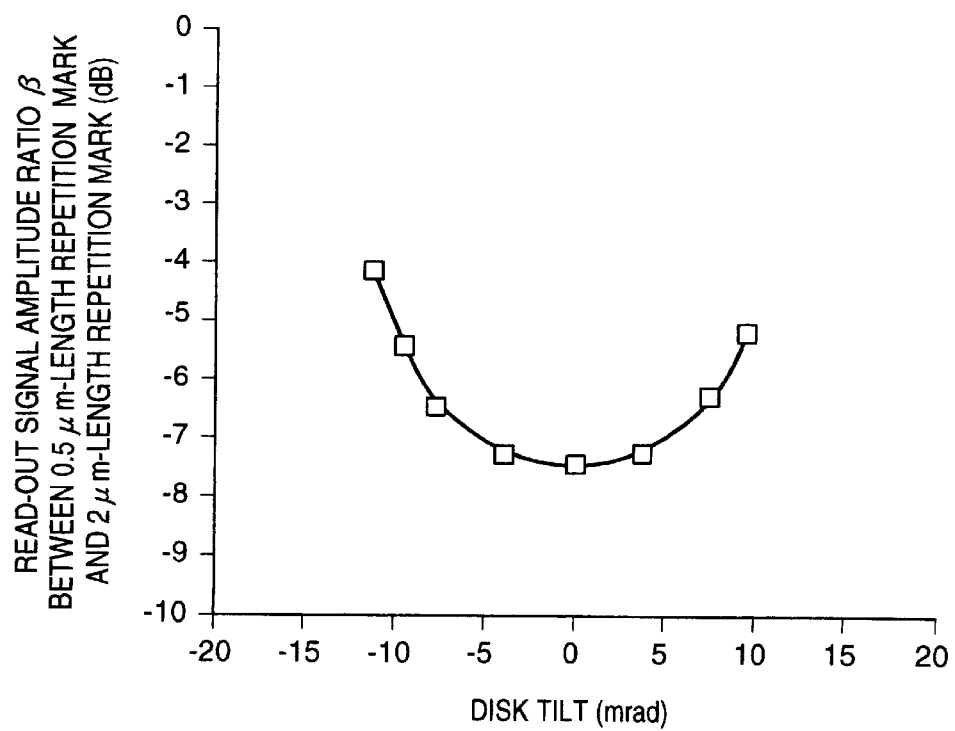
FIG. 5 is a graph showing the measured results of changes in the readout amplitude ratio between a 0.5 $\mu$m-length repetition mark and a 2 $\mu$m-length repetition mark in accordance with the tilt of a magneto-optical disk with respect to the optical axis of a readout laser beam radiating the magneto-optical disk in the configuration depicted in FIG. 1.

FIG. 5 shows experimental results of the change of the amplitude ratio β (dB) versus the tilt of the magneto-optical disk 1. For example, in a tilt range of from −10 mrad to +10 mrad, the change of the amplitude ratio β is not smaller than 2 dB. It is also apparent from FIG. 5 that the bit error rate in the readout information data increases for the aforementioned tilt of the magneto-optical disk 1 as explained above with reference to FIG. 17.

In the first embodiment, the power of the readout laser beam is adjusted so that the readout amplitude ratio β between the 0.5 μm-length repetition mark and the 2 μm-length repetition mark is set to an optimum value (for example, −7.5 dB). That is, as shown in steps in FIG. 6, the controller 30 sets the power of the laser driver 5 to an initial value (step 602); the readout amplitude values $A_1$ and $A_2$ of the 0.5 μm-length and 2 μm-length repetition marks detected by the test read pattern detector 28 are read (step 603); the amplitude ratio β between the above-mentioned amplitude values is calculated (step 604); the amplitude ratio β is compared with −7.5 dB (step 605); and the laser driver 5 is controlled on the basis of a result of the comparison to adjust the power of the readout laser light emitted from the laser diode 6 (step 606). Specifically, the power of the readout laser light is increased when the amplitude ratio β is smaller than −7.5 dB, and the power of the readout laser light is reduced when the amplitude ratio β is larger than −7.5 dB. Thus, the readout power correction is completed (step 607).

Figure 6:
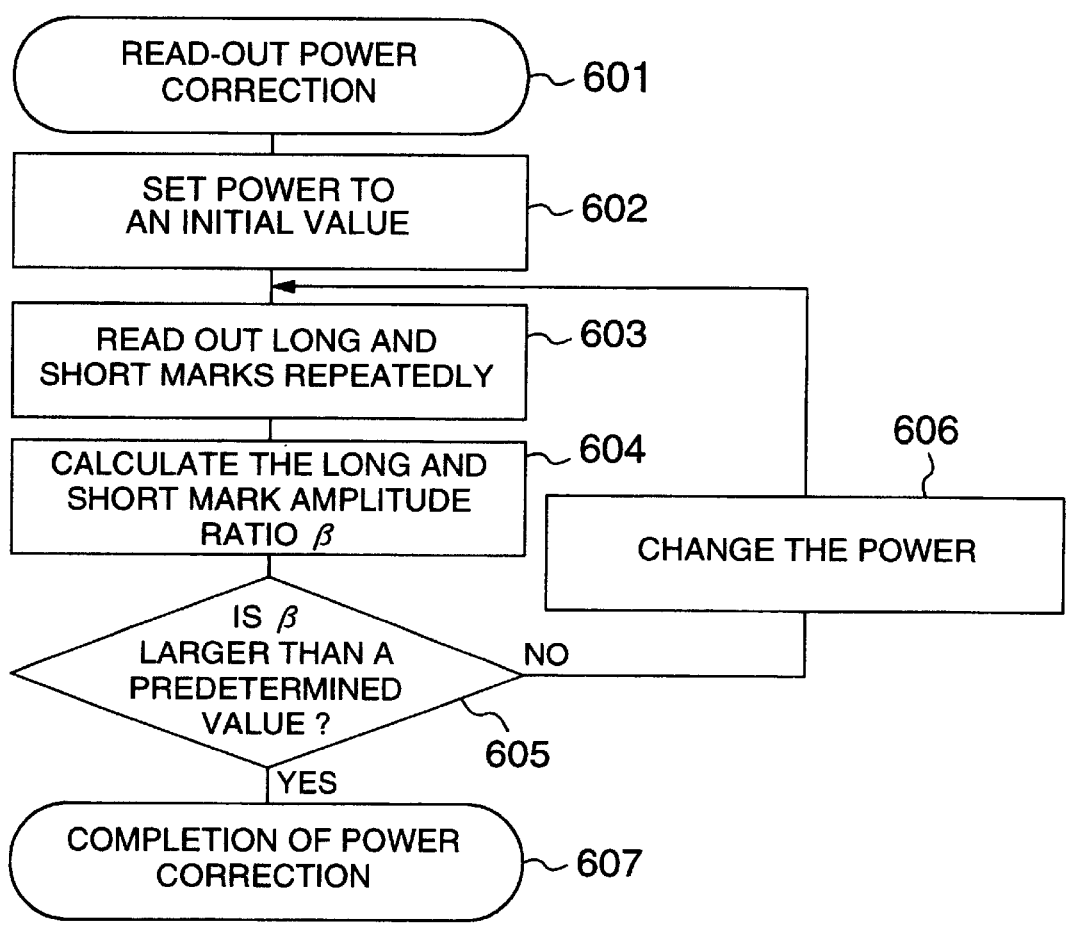
FIG. 6 is a flow chart showing the operation of readout power correction in the configuration depicted in FIG. 1.
Figure 7:
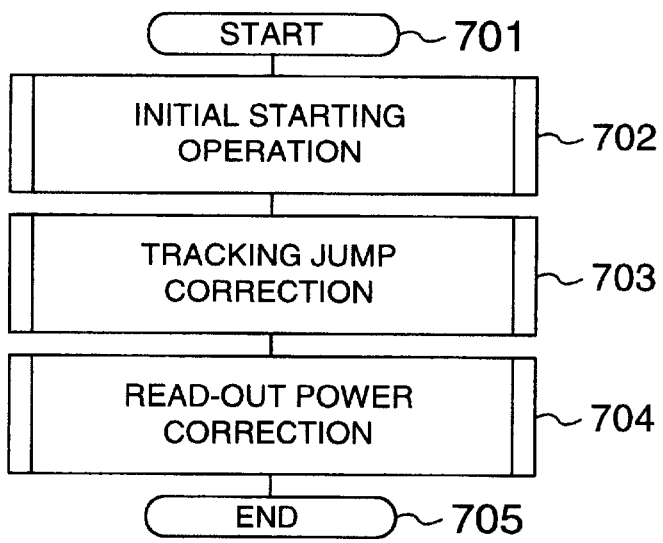
FIG. 7 is a flow chart showing a flow of the overall operation of the apparatus configured in FIG. 1.

In this manner, the power of the readout laser beam on the magneto-optical disk 1 is set to an optimum value even in the case where the magneto-optical disk 1 is tilted with respect to the optical axis of the readout laser beam irradiated onto the magneto-optical disk 1. That is, a series of processes in steps 701 to 705 in FIG. 7 is performed by the controller 30 when, for example, the magneto-optical disk is inserted. In this occasion, when the magneto-optical disk is inserted (step 701), the initial starting operation shown in FIG. 2 is carried out (step 702). Then, the track jump correction shown in FIG. 4 is performed (step 703). Then, the readout power correction shown in FIG. 6 is performed (step 704), so that a series of settings is completed (step 705).

Upon completion of these settings, the readout of the recorded information data is started, the readout signal from the detector 25 is amplified in the preamplifier 26 and then subjected to processing such as equalization, A/D conversion, etc., in the readout signal processor 27.

Figure 8:
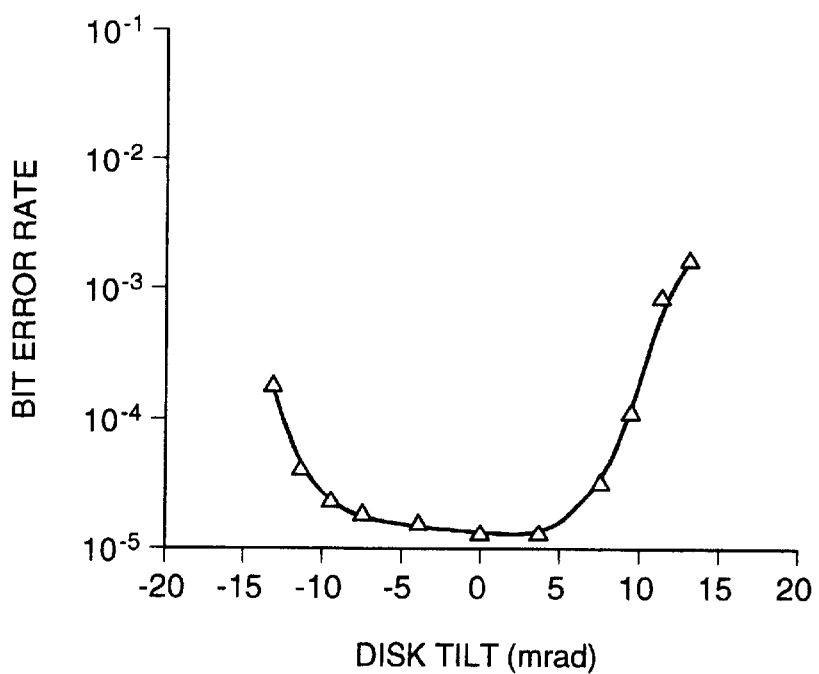
FIG. 8 is a graph showing measured results of the relation between the tilt of a magneto-optical disk with respect to the optical axis of a readout laser beam and the bit error rate in the embodiment configured in FIG. 1.

FIG. 8 is a graph showing measured results of changes in the bit error rate in the readout information data versus the tilt of the magneto-optical disk 1 in the first embodiment.

Figure 17:
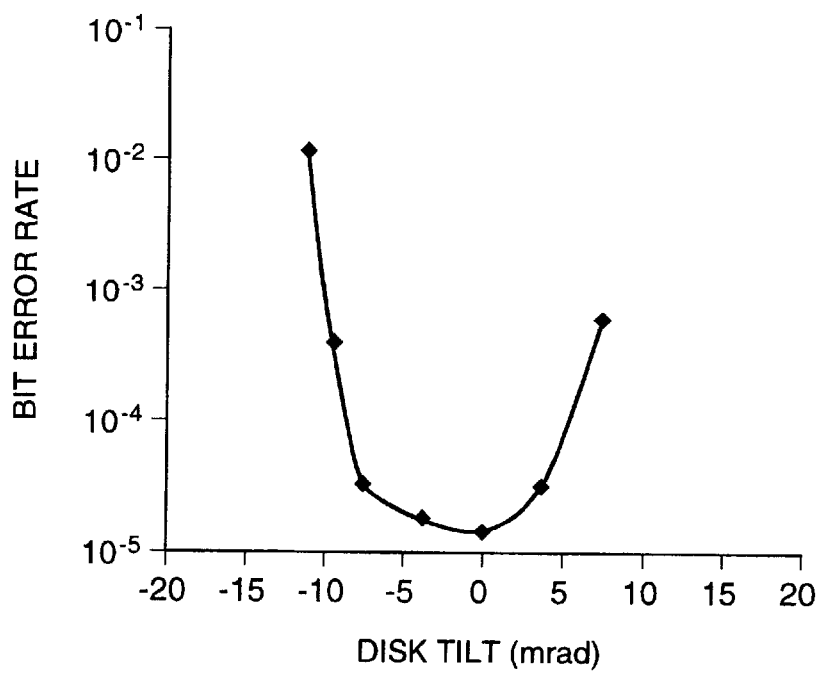
FIG. 17 is a graph showing measured results of the relation between the tilt of the magneto-optical disk with respect to the optical axis of the readout laser beam and the bit error rate in the prior art.

As is obvious from comparison between FIGS. 8 and 17, in the first embodiment, both correction of the tracking error signal and correction of the power of the readout laser beam are performed in accordance with the tilt of the magneto-optical disk 1, so that the range of tilt of the magneto-optical disk 1 which keeps the bit error rate to be lower than $10^{-4}$ is widened by 1.5 times compared with the prior art in which the aforementioned corrections are not performed. Accordingly, in the first embodiment, the margin for the tilt of the magneto-optical disk relative to the pickup becomes large compared with the prior art.

Figure 9:
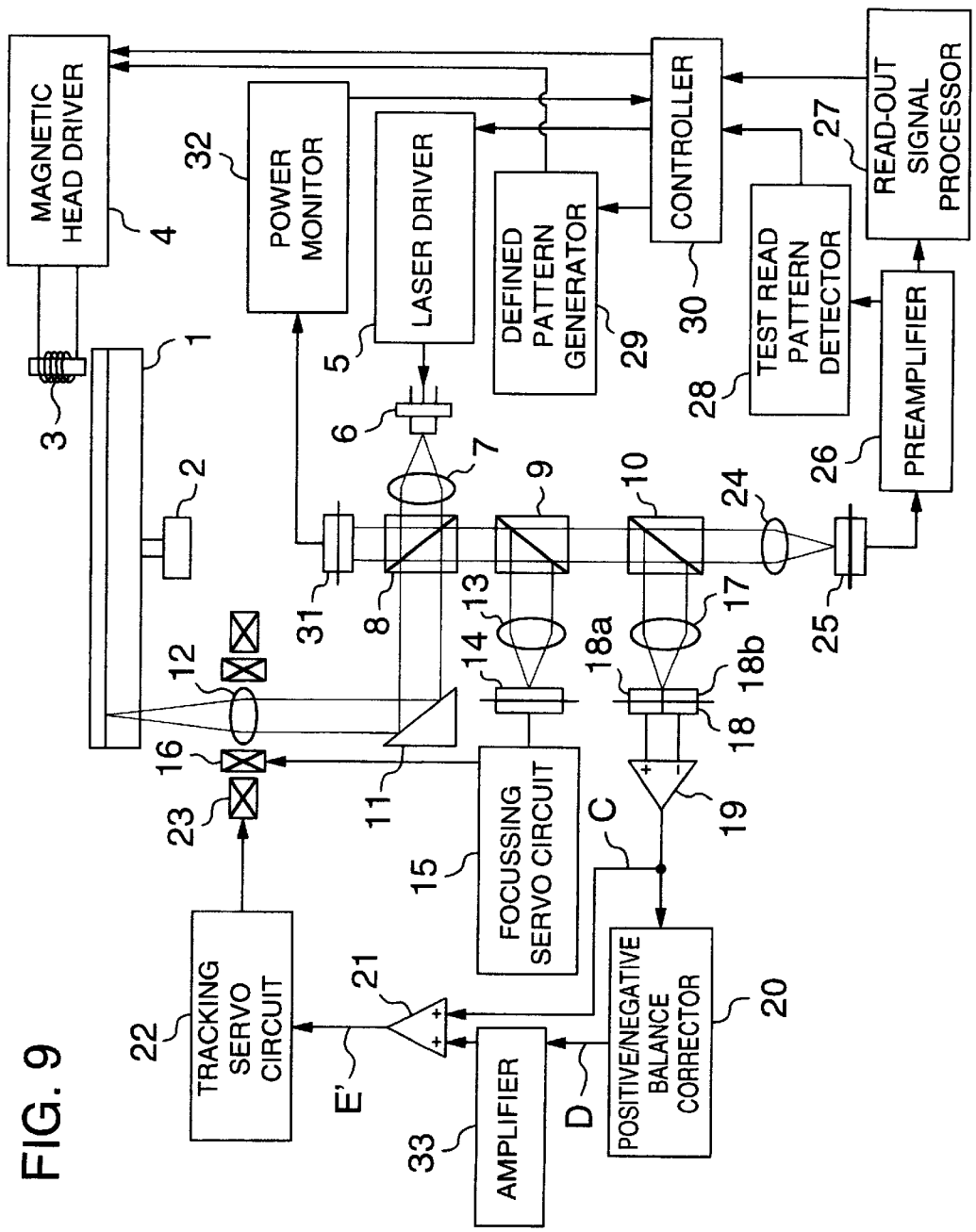
FIG. 9 is a block diagram showing another embodiment of the present invention.

FIG. 9 is a block diagram showing the magneto-optical information recording/reproducing apparatus according to a second embodiment of the present invention. In FIG. 9, the reference numeral 33 designates an amplifier. Parts in FIG. 9 similar to those in FIG. 1 are referenced correspondingly to avoid duplicated description.

In FIG. 9, the second embodiment is configured such that the amplifier 33 is provided posterior to the positive/negative balance corrector 20 so that the correction signal D from the positive/negative balance corrector 20 is amplified by the amplifier 33 and then supplied to the adder 21.

Figure 16:
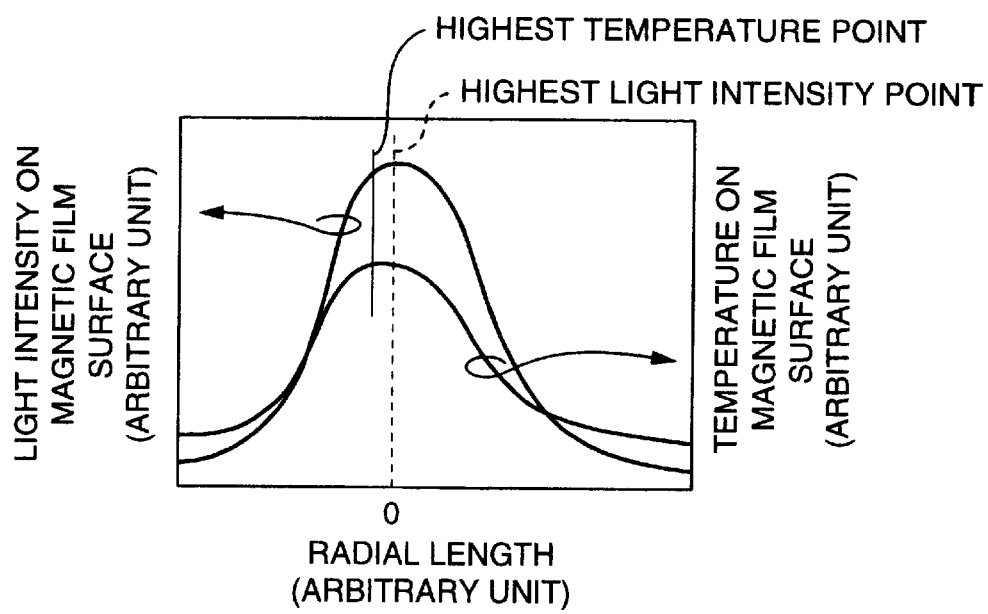
FIG. 16 is a graph showing displacement between a point at which the light intensity of the readout laser beam is highest and a point at which the temperature on the magneto-optical disk is highest in the case where the magneto-optical disk is inclined with respect to the optical axis of the readout laser beam.

As described preliminarily with reference to FIG. 16, when the magneto-optical disk 1 is tilted with respect to the optical axis of the readout laser beam radiated onto the magneto-optical disk 1, the highest temperature point obtained on the magneto-optical disk 1 by the readout laser beam is displaced from the highest light intensity point of the readout laser beam. Accordingly, when the tracking error signal is corrected on the basis of the correction signal D as described in the first embodiment shown in FIG. 1 in the state in which the magneto-optical disk 1 is tilted as described above, the highest light intensity point of the readout laser beam coincides with the center line of the track on the magneto-optical disk 1 but the highest temperature point obtained on the magneto-optical disk 1 by the readout laser beam is displaced from the center line of the track. Accordingly, the transfer temperature region is unbalanced in the direction of the width of the track.

In the second embodiment, the correction signal D from the positive/negative balance corrector 20 is amplified by the amplifier 33. The signal thus amplified is added as a new correction signal to the differential signal C from the subtractor 19 to thereby generate a tracking error signal E'. In this case, the amplification factor of the amplifier 33 is set so that the highest temperature point obtained in the transfer temperature region by the readout laser beam is made coincident with the center line of the track on the magneto-optical disk 1 by tracking control based on the tracking error signal E' obtained from the adder 21. For example, the amplification factor is set to 10 dB.

Figure 10A:
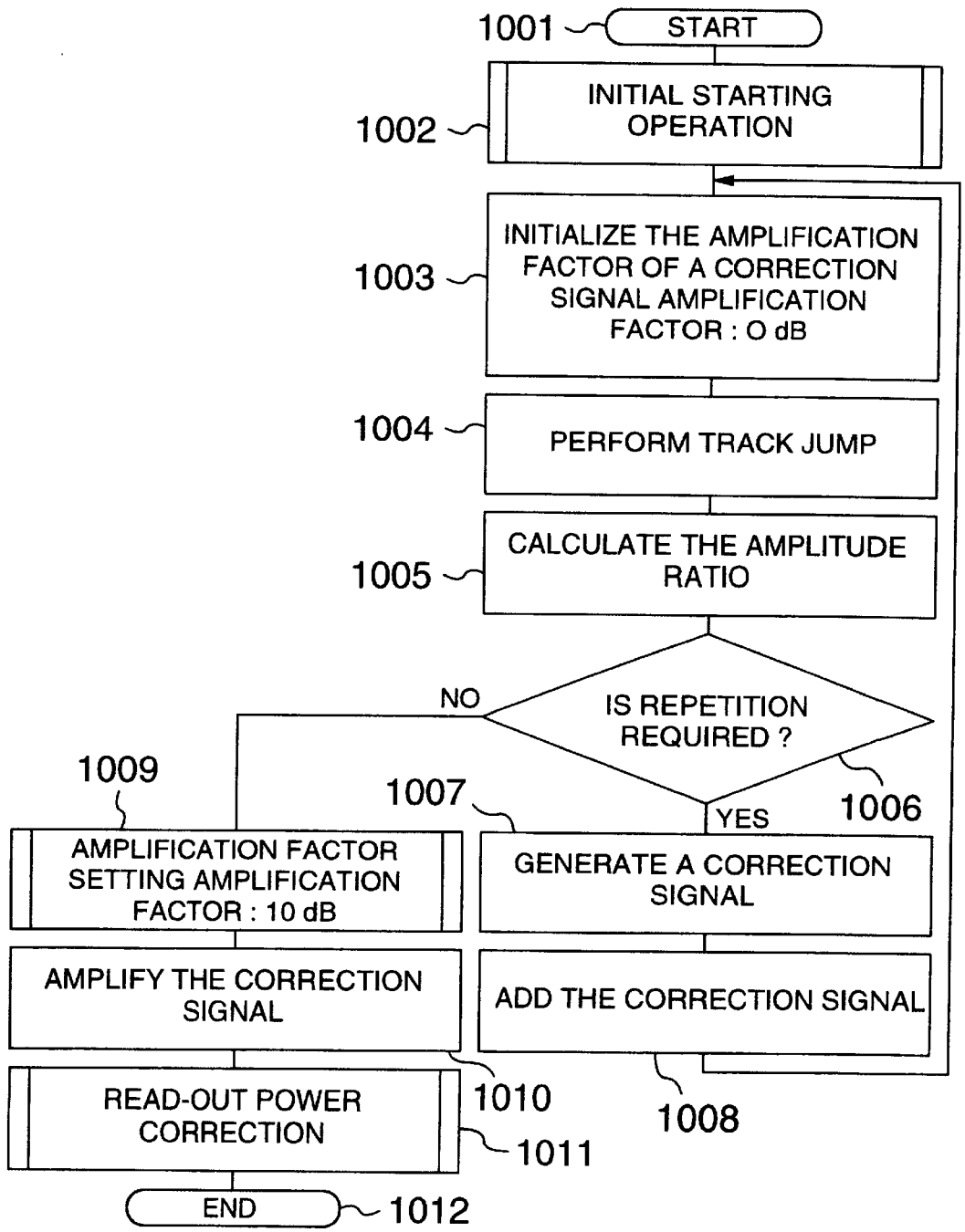
FIGS. 10A and 10B are flow charts showing the operation of the apparatus configured in FIG. 9.

That is, the operation of the apparatus configured as shown in FIG. 9 is carried out in accordance with steps shown in FIG. 10A.

From FIG. 7 showing the first example of the configuration, FIG. 10A is different as follows. In a series of steps 1001 to 1008 showing a flow of track jump from starting, first, the amplification factor of the amplifier 33 for amplifying the correction signal is once set to an initial value of 0 dB in step 1003. Thereafter, track jump correction is performed in the flow up to step 1008 in the same manner as in the first embodiment. When the track jump correction is completed, the amplification factor of the amplifier 33 which has been set initially to 0 dB is set to 10 dB (step 1009). The correction signal is amplified with the correction factor (step 1010). The readout power is corrected on the basis of the amplified correction signal (steps 1011 and 1012).

Figure 10B:
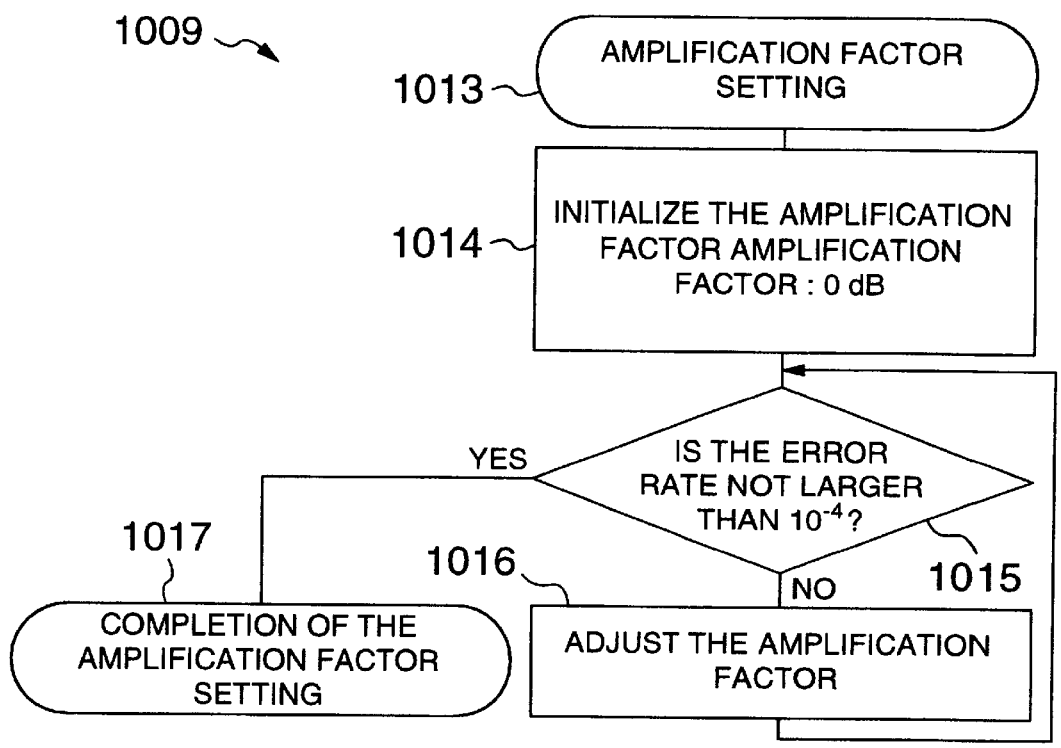

In the case where the track jump is performed only once to set the correction signal D, the positive/negative balance corrector 20 generates a DC correction signal D corresponding to the amplitude ratio β between positive and negative peaks of a track jump signal generated by the track jump on the basis of the track jump signal (step 1007). Thereafter, the correction signal D is outputted continuously and amplified by the amplifier 33, so that the amplified correction signal is added to the differential signal C to generate a tracking error signal E'. Tracking control is performed for readout the information data on the basis of the tracking error signal E'. On the contrary, in the case where track jump is repeated to modify the correction signal D as described above in the first embodiment, the amplification factor of the amplifier 33 is set to 0 dB in a period in which the correction signal D is modified as shown in FIG. 10B (step 1014) (specifically, the amplifier 33 may be formed to have such two amplification factors of 0 dB and 10 dB, or a changeover switch, or the like, may be provided so that the correction signal D bypasses the amplifier 33 so as to be directly supplied to the adder 21 in the modification period), so that, first, the center of the spot of the readout laser beam (highest light intensity point) is made coincident with the center line of the track. In steps 1015 and 1016, the amplification factor is adjusted so that the error rate is not higher than a predetermined value, for example, $10^{-4}$. When this tracking state is obtained, the amplification factor of the amplifier 33 is set to a predetermined value, for example, of 10 dB in step 1017 so that tracking control for readout the information data is performed.

Figure 11:
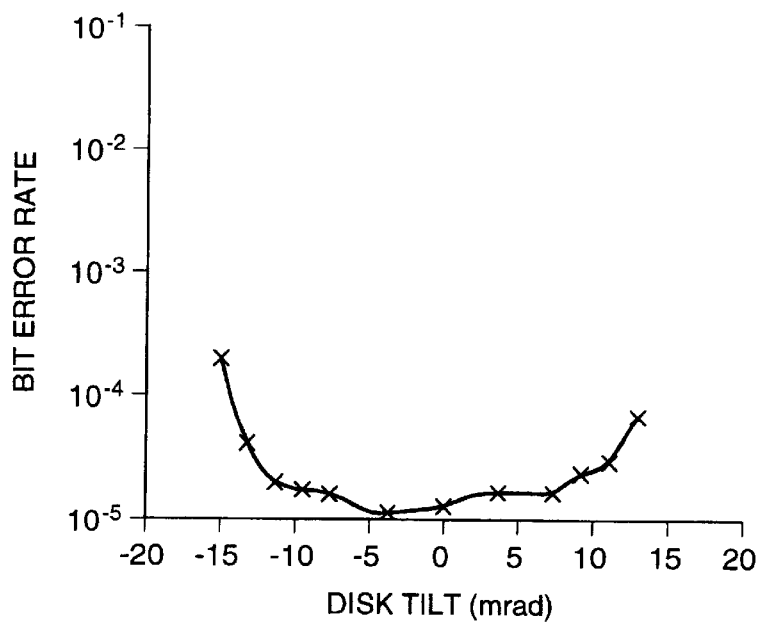
FIG. 11 is a graph showing measured results of the bit error rate in the configuration depicted in FIG. 9.

FIG. 11 is a graph showing measured results of the relation between the tilt of the magneto-optical disk 1 and the bit error rate in the second embodiment.

As is obvious from comparison between FIGS. 11 and 17, in the second embodiment, the range of tilt of the magneto-optical disk 1 which keeps the bit error rate to be lower than $10^{-4}$ is widened by twice compared with the prior art in which neither correction of the tracking signal nor correction of the power of the readout laser beam is performed. That is, in the second embodiment, the margin for the tilt of the magneto-optical disk or the apparatus is widened more greatly.

Figure 12:
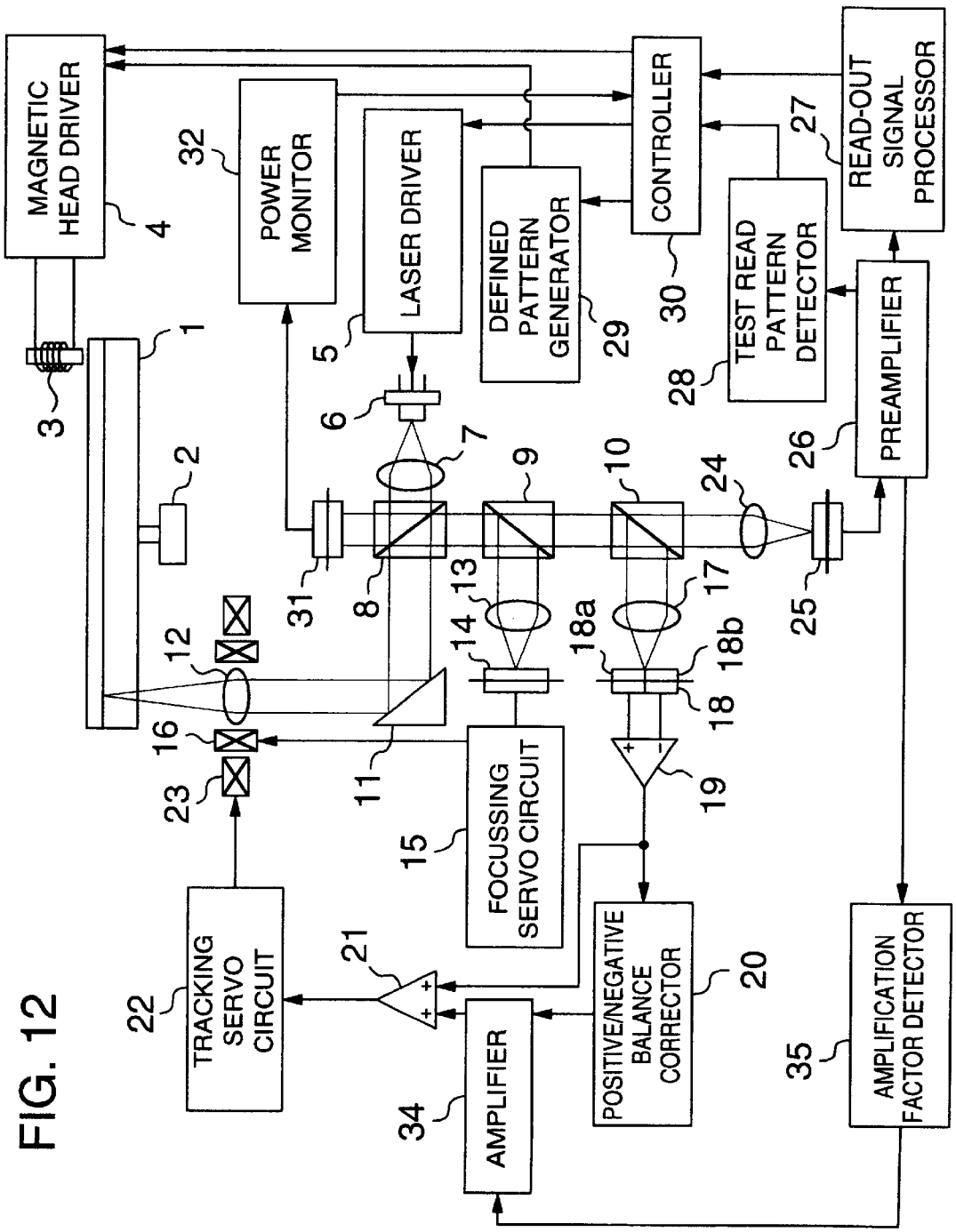
FIG. 12 is a block diagram showing a further embodiment of the present invention.

FIG. 12 is a block diagram showing the magneto-optical information recording/reproducing apparatus according to a third embodiment of the present invention. In FIG. 12, the reference numeral 34 designates a variable gain amplifier; and 35, an amplification factor detector. Parts in FIG. 12 similar to those in FIG. 9 are referenced correspondingly to avoid duplicated description.

In FIG. 12, the third embodiment is configured such that the amplifier 33 in the second embodiment shown in FIG. 9 is replaced by the variable gain amplifier 34 so that the amplification factor of the amplifier 34 is made variable by the amplification factor detector 35. Even in the case where the quantity of tilt of the magneto-optical disk 1 to be used is constant, the quantity of displacement of the highest temperature point from the center line of the track varies in accordance with the material for the magneto-optical disk 1, or the like. Accordingly, when different magneto-optical disks 1 are used, it is necessary to change the magnitude of the correction signal D individually. For this reason, the variable gain amplifier 34 is used so that the amplification factor of the amplifier 34 is changed.

Here, information for deciding the amplification factor of the variable gain amplifier 34 (amplification factor information) is preliminarily recorded on a predetermined position (such as a portion of the track subjected to track jump, or the like) of each of the magneto-optical disks 1 to be used. The position is scanned by the readout laser beam before generation of the correction signal D. The readout signal obtained from the detector 25 by this scanning is amplified by the preamplifier 26. The thus amplified signal is supplied also to the amplification factor detector 35, so that the amplification factor information is readout. The amplification factor of the variable gain amplifier 34 is set on the basis of the amplification factor information.

Figure 13:
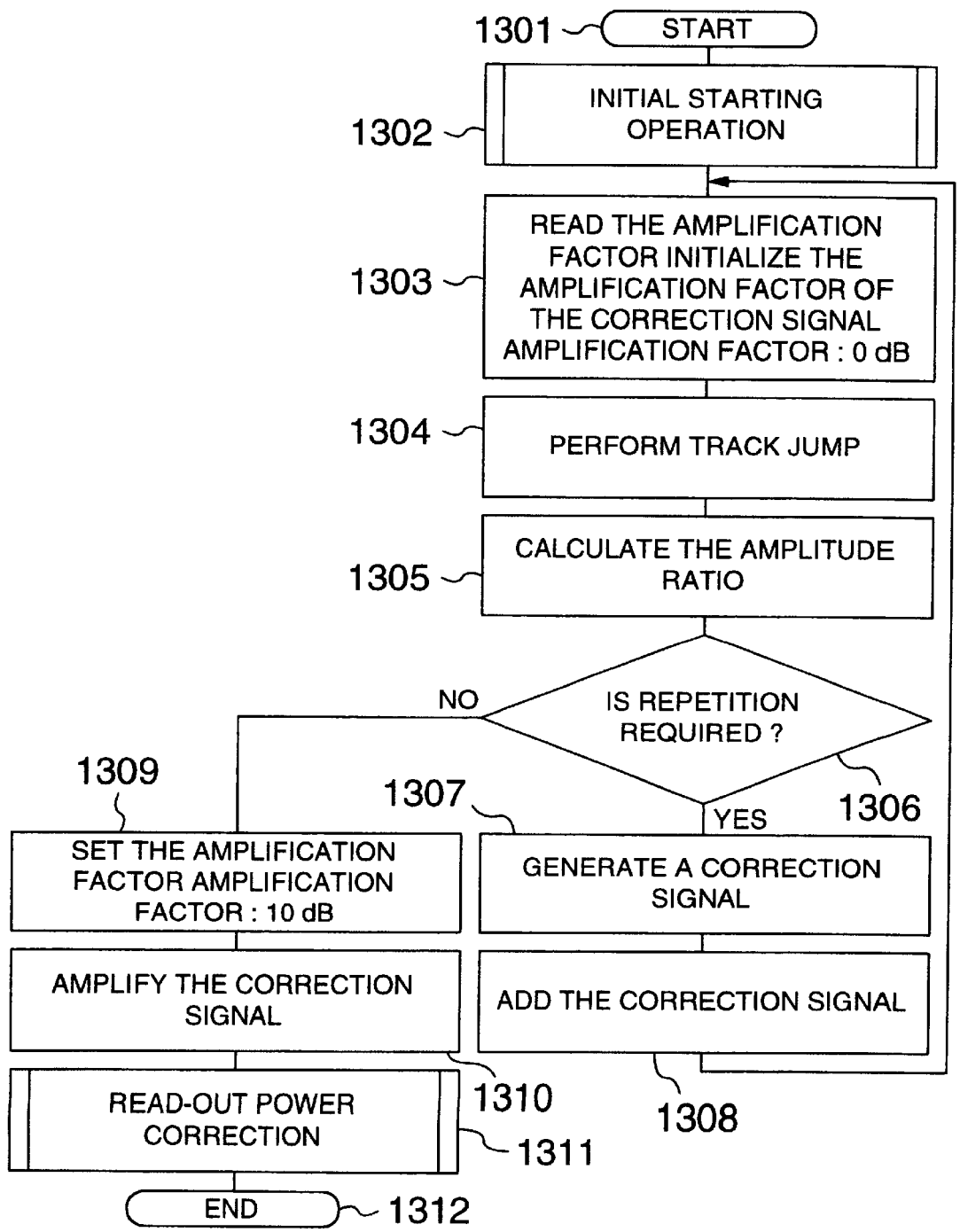
FIG. 13 is a flow chart showing the operation of the apparatus configured in FIG. 12.

FIG. 13 is a flow chart showing the operation of the apparatus configured as shown in FIG. 12. The point of difference of the embodiment shown in FIG. 13 from the previously-described embodiments is that an amplification factor recorded on the magneto-optical disk is read in the step 1303 so that the resulting amplification factor is set to a value based on the read amplification factor in the amplification factor setting step 1309.

Preferably, the amplification factor of the amplifier is set so that the highest temperature point obtained in the transfer temperature region by the laser beam is made coincident with the center line of the track on the magneto-optical disk 1 by tracking control based on the tracking error signal E' obtained from the adder 21. This means that the amplification factor is variably set to a value which can improve the S-N ratio and the error rate on the signal.

In this manner, the correction signal D is amplified to an optimum level in accordance with the magneto-optical disk 1 to be used. Accordingly, the highest temperature point in the transfer temperature region is made coincident with the center line of the track on the magneto-optical disk 1, so that crosstalk hardly occurs. Accordingly, in the third embodiment, the margin for the tilt of the magneto-optical disk or the apparatus is widened more greatly.

As described above, according to the embodiments of the present invention, even in the case where the magneto-optical information recording medium is tilted with respect to the optical axis of the readout laser beam when a magnetically induced super resolution technique is applied to readout the information data from the magneto-optical information recording medium, not only a good tracking state can be obtained to thereby reduce crosstalk but also lowering of the effective power of the readout laser beam on the magneto-optical information recording medium due to the tilt of the magneto-optical information recording medium can be prevented to thereby obtain desired good readout resolution and widen the margin for the tilt of the magneto-optical information recording medium or the apparatus.

Further, configuration is made such that the correction signal for correcting the tracking error signal is amplified with a desired amplification factor. Accordingly, displacement of the highest temperature point on the magneto-optical information recording medium by the readout laser beam from the center line of the track, which displacement is caused by the tilt of the magneto-optical information recording medium with respect to the optical axis of the readout laser beam, can be corrected. Accordingly, not only a better tracking state can be obtained to thereby reduce crosstalk more extremely but also the margin for the tilt of the magneto-optical information recording medium or the apparatus is widened more greatly.

What is claimed is:

1. A magneto-optical information recording/reproducing apparatus in which a magneto-optical information recording medium at least including a first magnetic film having magneto-optical information recorded on a track and having perpendicular magnetic anisotropy, and a second magnetic film to which said magneto-optical information recorded on said first magnetic film is transferred by irradiation of a laser beam, is used so that a readout laser beam is irradiated onto said second magnetic film to thereby readout said magneto-optical information transferred to said second magnetic film, wherein said apparatus comprises:

a 2-split detection means constituted by two detection elements for receiving said readout laser beam reflected from said second magnetic film of said magneto-optical information recording medium;

a subtraction means in which output signals of said two detection elements of said 2-split detection means having levels corresponding to the quantities of light received by said two detection elements respectively are subtracted from each other to generate a differential signal expressing the difference between said output signals;

means for making a spot of said laser beam jump one track before readout said magneto-optical information from said magneto-optical information recording medium;

a positive/negative balance correction means for detecting an amplitude ratio between positive and negative side amplitudes in a track jump signal generated in said differential signal from said subtraction means in response to the track jump to thereby output a correction signal in accordance with said amplitude ratio; and an addition means for adding said correction signal to said differential signal to thereby generate a tracking error signal for tracking control used in readout of said magneto-optical information from said magneto-optical information recording medium.

2. A magneto-optical information recording/reproducing apparatus according to claim 1, wherein said positive/negative balance correction means is designed to output said correction signal so that the amplitude ratio between the positive and negative side amplitudes in said track jump signal is set to 1.

3. A magneto-optical information recording/reproducing apparatus according to claim 2, wherein at least one of said at least two kinds of defined patterns is a pattern having a length shorter than a diameter of a spot of said readout laser beam.

4. A magneto-optical information recording/reproducing apparatus according to claim 1, further comprising:

means for extracting readout signals of at least two kinds of defined patterns recorded in a predetermined region of said magneto-optical information recording medium; and means for detecting the amplitude ratio of the readout signal of each of said defined patterns and for controlling the intensity of said laser beam to make the detected amplitude ratio coincident with a predetermined value.

5. A magneto-optical information recording/reproducing apparatus according to claim 1, further comprising an amplifier for receiving an output signal of said positive/negative balance correction means, for applying predetermined amplification to said signal and for sending the resulting amplified signal to said addition means.

6. A magneto-optical information recording/reproducing apparatus according to claim 5, wherein:

said amplifier is constituted by a variable gain amplifier including an amplification factor detector for detecting an optimum amplification factor peculiar to said magneto-optical information recording medium and preliminarily recorded on said magneto-optical information recording medium; and said variable gain amplifier performs amplification after a gain of said variable gain amplifier is set to said optimum amplification factor which is peculiar to said magneto-optical information recording medium and detected by said amplification factor detector.

7. A magneto-optical information recording/reproducing method in which a magneto-optical information recording medium at least including a first magnetic film having magneto-optical information recorded on a track and having perpendicular magnetic anisotropy, and a second magnetic film to which said magneto-optical information recorded on said first magnetic film is transferred by irradiation of a laser beam, is used so that a readout laser beam is irradiated onto said second magnetic film to thereby readout said magneto-optical information transferred to said second magnetic film, wherein said method comprises the steps of:

generating a tracking error signal by a tracking servo operation to thereby perform tracking error correction;

performing track jump to detect positive and negative peaks of a jump waveform;

generating a correction signal for setting a ratio between the positive and negative peaks to 1; and adding said correction signal to said tracking error signal.

8. A magneto-optical information recording/reproducing method according to claim 7, further comprising the steps of:

setting power of said laser beam to an initial value;

repeatedly readout at least two kinds of defined patterns recorded in a predetermined region of said magneto-optical information recording medium;

calculating an amplitude ratio between said defined patterns; and changing the power of said laser beam so as to set the amplitude ratio to a value larger than a predetermined value to thereby correct the power of said laser beam.

9. A magneto-optical information recording/reproducing method according to claim 8, wherein at least one of said defined pattern is a pattern having a length shorter than a diameter of a spot of said readout laser beam.

10. A magneto-optical information recording/reproducing method according to claim 7, wherein said correction signal is amplified with an amplification factor set to a predetermined value before the amplified correction signal is added to said tracking error signal.

11. A magneto-optical information recording/reproducing method according to claim 10, wherein said amplification factor is adjusted so that an error rate in a readout signal is not larger than a predetermined value.

12. A magneto-optical information recording/reproducing method according to claim 10, wherein an optimum amplification factor peculiar to said magneto-optical information recording medium and recorded on said magneto-optical information recording medium is read in so that said amplification factor is set on the basis of said peculiar optimum amplification factor thus read in.

* * * * *